Aug. 4, 1964 N. B. COHEN 3,143,270

SINGLE-EDGE GUIDE FOR MOVING TAPE

Filed June 18, 1962

INVENTOR
NEAL B. COHEN

BY *William G. Miller Jr.*
AGENT

United States Patent Office 3,143,270
Patented Aug. 4, 1964

3,143,270
SINGLE-EDGE GUIDE FOR MOVING TAPE

Neal B. Cohen, Philadelphia, Pa., assignor to Sperry Rand Corporation, New York, N.Y., a corporation of Delaware Filed June 18, 1962, Ser. No. 203,286
9 Claims. (Cl. 226—196)

Figure 1:
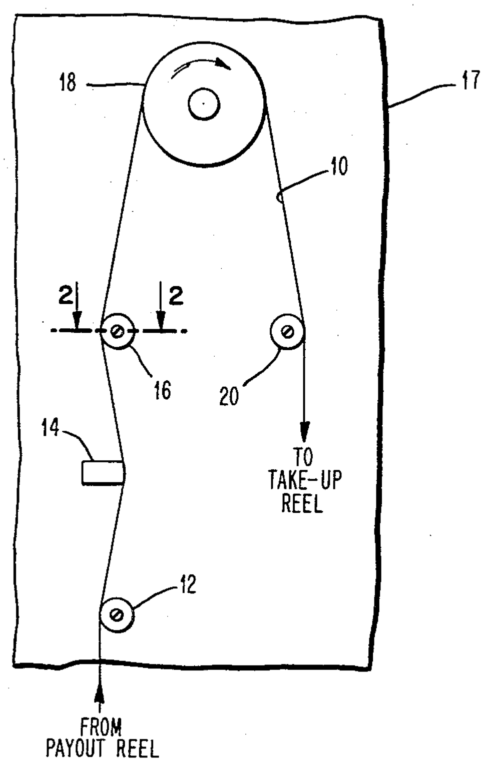

This invention relates to a guide for moving tape and more particularly to a guide having a single edge to perform the guiding function.

Various types of flexible tape are presently in use as means for storing information. These tapes are usually passed between a pair of reels in a path which carries the tape over a recording or a sensing means. Since these tapes may carry a number of channels of information which channels may be spaced across the width of the tape and since the bits of information contained in these channels are usually stored in small areas, it is of the utmost importance that the tape be transported across the recording or sensing transducer in such a way that the tape traverses the transducer at a constant, desired angle and preferably without skew.

Various guiding arrangements have been tried in the past including guides involving two edges in which one edge is subjected to spring loading to maintain the opposite edge of the tape against a fixed shoulder of the guide. Guides of this type require extremely critical spring loading in order to properly guide the tape without damage.

Other types of guides which have been used include tapered guides which rely upon their tapered surfaces to produce a force which is lateral or sideways to the tape as it passes over the guide. This lateral force, which is due to the tension in the tape and the taper of the guide, maintains one edge of the tape against a fixed shoulder. Such guides have, however, been found to be disadvantageous in that the unequal tension in the tape at the edges resulting from the taper of the guide, and the change in angle of the tape with respect to the transducer causes the edge of the tape which is under the least amount of tension to be less firmly held against the transducer surface as it is passing thereover. The result is a lack of close contact between that edge and the transducer and hence a considerable decrease in the signal strength from the channels along that edge.

It is, therefore, an object of this invention to provide an improved tape guide.

A further object of this invention is the provision of a tape guide which will be effective to maintain the tension along the opposite edges of the tape substantially equal.

A further object of this invention is the provision of a tape guide which will not allow excessive variations in the tension as between various areas across the tape.

A still further object of this invention is the provision of a tape guide which will provide a guiding force to maintain the tape constantly along a predetermined path without at the same time changing the angle of the tape as it traverses that path.

In carrying out the above objects, this invention provides a tape guide unit having a reference surface for establishing the desired lateral position of the tape. The guiding force for maintaining the tape edge against the reference surface is the resultant of those forces produced by the plurality of surfaces which make up the guide unit, which surfaces also support the tape as it moves thereover. A first of these supporting surfaces is positioned to support that edge of the tape which is away from the reference surface. This first supporting surface is shaped so that there is produced by virtue of the tension in the tape a lateral force on the tape in a direction toward the reference surface. A second supporting surface adjacent the reference surface serves to maintain a tension in that edge of the tape which is against the reference surface approximately equal to the tension in the opposite edge of the tape. This surface must also avoid the production of any lateral forces on the tape in a direction away from the reference surface which would be of magnitude sufficient to overcome the necessary guiding force provided by the said first supporting surface.

Figure 2:
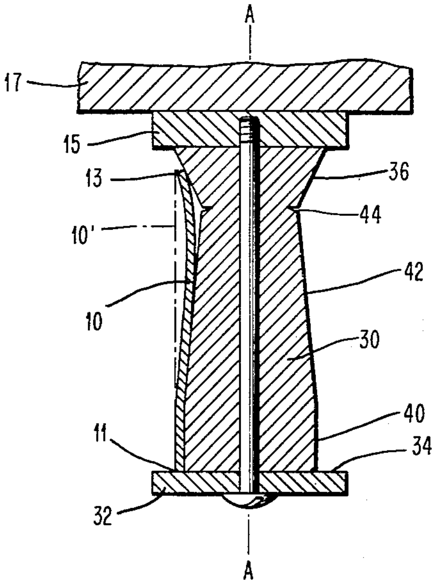

For a better understanding of the invention, reference should be had to the accompanying drawings wherein:

FIGURE 1 is a plan view showing one arrangement of guide units for guiding tape over a transducer, FIGURE 2 is a cross-section view of the novel tape guide unit showing the normal conformation of a thin tape to the surfaces of the guide unit as it is translated thereover as well as the position a stiff tape would take.

Referring to FIGURE 1, the tape 10 may, as in this diagram, be fed from a payout reel (not shown) along a path which traverses tape guide 12, transducer head 14, tape guide 16, capstan 18, and tape guide 20 from which the tape goes to the take-up reel. While this path utilizes three tape guides of the type to be further described, namely, guides 12, 16 and 20, it will be evident that the guide 20 may be dispensed with, if desired.

In the normal operation of tape transport units, particularly those used with magnetic tape in digital computers, the magnetic tape is accelerated and decelerated rapidly and frequently between a static condition and a high rate of feed. For efficiency in such start-stop service, it is preferable that the guides 12, 16 and 20 be stationary in order that it is not necessary to accelerate their mass.

The tape would normally be fed by the capstan 18 in the direction shown by the arrow which may be considered the forward direction so as to pull the tape from the direction of the payout reel so that it traverses the transducer head and then is fed in the direction of the take-up reel although, as will be evident to those skilled in the art, this direction of feed may be reversed.

Each of the guides 12, 16 and 20 of FIGURE 1 desirably has the structure of the novel tape guide shown in cross section in FIGURE 2; and, as shown in FIGURE 1, they are mounted to have their axes paralleled to each other and parallel to the axis of the capstan and the active surface of the transducer. The tape guide of FIGURE 2, as shown, is a solid of revolution in the form of a spindle 30. This spindle includes one section forming a shoulder 32 which may be a separate piece as shown and which provides a reference surface 34 which is so placed by virtue of the use of spacer member 15 mounted on support surface 17 so as to provide a means for establishing the desired lateral position of the tape 10 when the edge 11 of the tape 10 is maintained in contact with the reference surface 34 during tape motion.

In order to maintain the tape 10 in constant contact with the reference surface 34 during motion of the tape, it is necessary to provide a constant lateral force on the tape 10 which will maintain the tape edge 11 against the surface 34. This lateral force is produced in the novel tape guide of FIGURE 2 by one of a plurality of supporting surfaces which the spindle provides for the tape.

The spindle surface 36 formed by a tapered section of the spindle establishes this lateral guiding force. The surface 36 of the tapered section is shown in FIGURE 2 as being that of a conic frustrum whose smallest cross section is toward the shoulder 32. For the purpose of this description, this orientation of the tapered section may be considered as one providing a surface 36 which has an acute angular relationship to the reference surface 34, or the surface 36 itself may be considered as one having apical lines, that is straight lines in the surface which would intersect the apex of the cone of which the section is a frustrum. These lines form an acute angle with the plane of the reference surface 34.

The conical surface 36 is spaced from the shoulder 32 sufficiently so that it supports the outer edge 13 of the tape 10 and a portion of the tape adjacent thereto. A further requirement of conical surface 36 of this tapered section is that it should have a radius from its axis AA in the area supporting the edge 13 which is of a particular value, namely, a value which corresponds to the radius at which the edge 11 is to be maintained.

A second supporting surface of the spindle 30 is provided by a section of the spindle adjacent shoulder 32. The surface 40 of this section is, in the embodiment of FIGURE 2, a right cylindrical surface adjacent the reference surface 34. The radius of this right cylindrical surface, as previously mentioned, is desirably of a value equal to the radius of the surface 36 at the edge 13 of the tape 10.

Magnetic tape as well as other forms of recording tape are manufactured in such a way that from one tape to the next the width may vary sufficiently to prevent suitable guiding by trapping between two fixed surfaces. It is this fact which makes a single edge guide of particular utility. It is desirable with the guide structure of FIGURE 2 that the edge 13 should be at a radius which is equal to or greater than the radius of the surface 40 supporting the edge 11 whenever the narrowest portion of the tape is on the guide spindle 30. This assures a greater tension in edge 13 than in edge 11 and thus also assures that a guiding force maintaining the tape edge 11 against the reference surface 34 will be present. However, if it is desired to effect a decrease in the guiding force effected by the surface 36, the edge 11 can be maintained at a greater radius than that at edge 13 by a surface 40 of greater radius.

While the supporting surfaces 36 and 40 in conjunction with the reference surface 34 are sufficient to establish the essential features of the novel guide of this invention; namely, maintaining a minimum variation in tape tension across the tape and the maintenance of a parallel relationship between the tape and the transducer surface, it will be evident that it is necessary that there be a section of the spindle providing a transition in the surface of the spindle 30 from the surface 36 to the surface 40. This transition section may also be a tapered section, as shown in FIGURE 2 and have a surface 42 whose shape is that of a conic frustrum, the taper being opposite that of the section having surface 36.

The surface 42 has the effect of producing a lateral force on the tape 10 which is directed away from the reference surface 34 of shoulder 32. At will be evident from FIGURE 2, the surfaces 36 and 42 are separated by an undercut 44 which has no function in the operation of the guide but instead serves as a relief in the machining of the guide.

The flexible tape 10 if it is sufficiently thin will, as shown, conform to the supporting surfaces 36, 40 and 42 of the spindle 30 through its angle of wrap. As a result the tension in the tape causes the above mentioned lateral forces to be exerted on the tape by the surfaces 36 and 42 as the tape traverses the spindle. For the proper guiding of the tape 10, it is obviously only necessary that the lateral force toward the reference surface 34 of shoulder 32, which results from surface 36 in the region adjacent the edge 13 of tape 10, should be sufficiently greater than the force exerted by the other surfaces, particularly surface 42, on the remaining areas of tape so as to allow the resultant of the lateral forces as established by surfaces 36 and 42 to be sufficient to maintain the edge 11 in constant running contact with the reference surface 34 as the tape traverses the spindle 30. This is primarily possible because of the inclusion of the right cylindrical surface 40 which supports tape edge 11 while avoiding the establishment of lateral forces on this guided edge where its effect would be greatest and therefore disadvantageous to the desired guiding.

In order that the lateral forces may act to guide the tape 10, it is necessary that the tape have a sufficient degree of wrap around the spindle 30 to produce sufficient forces. This degree of wrap may desirably be on the order of 20°, however, it has been found that a very small degree of wrap is sufficient to accomplish the desired purpose in most cases. This, of course, will depend upon the angles of the surfaces 36 and 42 and the rate at which the tape traverses the spindle 30 as well as other factors.

It has been found that tape guides of the type shown in FIGURE 2 which have a conical surface 36 forming an angle of approximately 20 to 25° with the axis AA along with the accompanying conical surface 42 having an angle of approximately 1° provides a combination which has been found to be suitable for guiding ½ inch "Mylar" tape at speeds on the order of 100"/sec. with an acceleration time of approximately 1.5 ms. without any noticeable damage to the tape itself and particularly to the edge 11 after a large number of passes of the tape through a transport system of the type shown in FIGURE 1.

Since a relatively small area of the tape 10 conforms to the surface 36 which has the steepest taper in the embodiment of FIGURE 2, the taper of surface 42 must, since it has a larger area of tape conforming to it, have a much more shallow taper in order that the resultant lateral force on the tape is in a direction toward reference surface 34 and is of sufficient magnitude to accomplish the guiding function.

If a stiff tape is to be guided it will take the position shown as 10' and will be effected only by surfaces 36 and 40.

It will be evident to those skilled in the art that other different configurations of the supporting surfaces of FIGURE 2 may be utilized while maintaining the essential features of this invention. Thus the surfaces 36 and 42 need not be conical but instead could be contoured in a wide variety of shapes. It is only necessary that the tangent to the surface 36 where it supports the edge 13 as compared with that of surface 40 adjacent the surface 34 should differ sufficiently to provide a resultant force adequate to guide the tape against shoulder 32.

The embodiments of the invention in which an exclusive property or privilege is claimed are defined as follows:

1. A tape guide having
   (1) a reference surface oriented to establish the desired lateral position of one edge of the tape along the desired path,
   (2) a first supporting surface spaced from said reference surface so as to support the other edge of said tape along an arcuate path having a particuplar radius from an axis normal to said reference surface, said first supporting surface being shaped to be inclined to and facing said reference surface so as to maintain said one edge of said tape against said reference surface,
   (3) a second supporting surface adjacent to said reference surface and shaped so as to support said one tape edge along an arcuate path having substantially said particular radius.
2. A tape guide as set forth in claim 1 in which said first supporting surface is the surface of a conic frustrum whose smallest cross section is nearest said reference surface.
3. A tape guide as set forth in claim 1 in which said second supporting surface is the surface of a right cylinder whose radius is said particular radius.
4. A tape guide as set forth in claim 2 in which said second supporting surface is the surface of a right cylinder whose radius is said particular radius.

5. A tape guide as set forth in claim 4 in which said first and said second supporting surfaces are connected by another supporting surface formed by a conic frustrum whose smallest cross section is away from said reference surface.

6. A tape guide as set forth in claim 5 in which
(1) said first supporting surface forms an angle of 20 to 25 degrees with its axis of revolution,
(2) and said other supporting surface forms an angle of approximately 1 degree with its axis of revolution.

7. A tape guide unit for maintaining a constant lateral positioning of the path of one edge of a moving tape comprising
(1) a reference surface for establishing the desired lateral position of said one edge,
(2) a plurality of surfaces for supporting said tape as it is moved thereover,
(*a*) a first of said supporting surfaces being positioned to support the other edge of said tape for movement through an arcuate path whose radius of curvature at each point is of predetermined value, said first supporting surface having an angular relationship to said reference surface such that the tension in said tape as it traverses said guide unit is effective to produce in that portion of the tape conforming to said first surface a guiding force in a lateral direction tending to maintain said one edge of said tape against said reference surface,
(*b*) a second of said supporting surfaces adjacent said reference surface being so shaped and oriented as to support the said one edge of said tape for movement thereover through an arcuate path of shape corresponding to the said arcuate path of said other edge and so that opopposite points along the edges of said tape as it approaches and leaves said guide unit fall on lines having an angle to said reference surface corresponding respectively with those angles established by lines through opposite edge points as established by conformation of the tape edges to said first and second supporting surfaces on areas of first and last contact between said tape and said supporting surfaces, said second supporting surface being so shaped that the laterally directed forces produced by said second supporting surface in a direction away from said reference surface are sufficiently less than the opposing lateral forces produced by said first supporting surface to allow a maintenance of a resultant lateral force on said tape toward said reference surface sufficient to maintain said one edge of said tape against said reference surface.

8. A guide for maintaining a constant alignment of a tape in transport comprising
a spindle having a plurality of surfaces including
(*a*) a reference surface for establishing the desired path of one edge of said tape,
(*b*) a first supporting surface spaced from said reference surface sufficiently to provide a supporting surface for an area of tape adjacent the other edge and having the shape of a conic frustrum oriented so that apical lines therein have an acute angular relationship to said reference surface and so that the said other edge of said tape is supported along a path of predetermined radius,
(*c*) a second supporting surface adjacent said reference surface and having a cylindrical shape whose radius corresponds substantially to said predetermined radius,
(*d*) whereby said lateral forces due to said first supporting surface tend to maintain the said one edge of said tape against said reference surface while the tension in both edges of said tape is maintained substantially equal and variations in tension across the tape are minimized.

9. A guide for supporting tape as it moves over said guide comprising
a spindle having a plurality of shaped sections including
(*a*) a shoulder having a surface to which the axis of said spindle is normal and which provides a reference plane for guiding one edge of said tape,
(*b*) a section for producing a guiding force, said section being spaced from said shoulder sufficiently to provide support for the other edge of said tape, said section having the shape of a conic frustrum whose axis is that of the spindle and whose smallest section is toward said shoulder section, the angle of apical lines in said surface with said axis being 20 to 25 degrees so that a substantial force on said tape toward said shoulder is produced, the radius of that portion of the conical surface in the area which said other edge of said tape traverses being of a particular value,
(*c*) another section adjacent said shoulder and having a surface forming a right cylinder to said shoulder, said right cylinder having its axis along the axis of said spindle and its radius slightly less than said particular value,
(*d*) a further section connecting said section producing a guiding force and said other section and having the shape of a conic frustrum whose axis is the axis of said spindle and smallest section is away from said shoulder, the angle of apical lines in said surface to the axis of said spindle being on the order of one degree whereby the force on said tape in a direction away from said shoulder due to conformation of said tape to a portion of said further section surface is substantially less than the opposing force due to conformation of the tape to the surface of said section producing said guiding force.

References Cited in the file of this patent

UNITED STATES PATENTS

| | | |
|---|---|---|
| 1,323,298 | MacFarlane | Dec. 2, 1919 |
| 2,826,939 | Dever | Mar. 18, 1958 |
| 2,916,228 | Wellington | Dec. 8, 1959 |

FOREIGN PATENTS

| | | |
|---|---|---|
| 715,956 | Great Britain | Sept. 22, 1954 |